(12) United States Patent
Warashina et al.

(10) Patent No.: US 6,512,514 B1
(45) Date of Patent: Jan. 28, 2003

(54) FLAT DISPLAY DEVICE

(75) Inventors: Rikiya Warashina, Fukaya (JP); Mamiko Sugiyama, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 188 days.

(21) Appl. No.: 09/633,166

(22) Filed: Aug. 4, 2000

(30) Foreign Application Priority Data

Aug. 5, 1999 (JP) ............................................ 11-222562

(51) Int. Cl.⁷ ................................................ G09G 5/00
(52) U.S. Cl. ............................. 345/206; 345/87; 349/58
(58) Field of Search ................................. 345/204, 205, 345/206, 87; 349/58, 59, 60, 56

(56) References Cited

U.S. PATENT DOCUMENTS 5,666,172 A * 9/1997 Ida et al. ...................... 349/58
5,999,238 A * 12/1999 Ihara ............................ 349/58

* cited by examiner

*Primary Examiner*—Dennis-Doon Chow
(74) *Attorney, Agent, or Firm*—Pillsbury Winthrop LLP

(57) ABSTRACT

A liquid crystal display device has a liquid crystal display panel and a surface light source unit laminated and located on a resin frame. The frame integrally comprises a connection frame having a projecting portion. A drive circuit board connected to the liquid crystal display panel is opposed to the surface light source unit. The drive circuit board has a first end screwed to the frame and a second end having an engaging projection. The engaging projection is attached to the frame by engaging the projecting portion of the frame.

14 Claims, 4 Drawing Sheets

FLAT DISPLAY DEVICE

CROSS-REFERENCE TO RELATED APPLICATIONS

This application is based upon and claims the benefit of priority from the prior Japanese Patent Application No. 11-222562, filed Aug. 5, 1999, the entire contents of which are incorporated herein by reference.

BACKGROUND OF THE INVENTION

The present invention relates to a flat display device represented by liquid crystal display devices.

Modern flat display devices, which are represented by liquid crystal display devices, are thin, light in weight, and highly power-efficient. Taking advantages of these features, they are utilized as various display devices for TV sets, computers, car navigation systems, etc.

In general, a liquid crystal display device of the light transmission type, for example, comprises a liquid crystal display panel, which includes a liquid crystal layer held between a pair of substrates, and a surface light source unit put on one surface of the display panel. The liquid crystal display panel and the surface light source unit are placed on a substantially rectangular resin frame. Overlying the display panel, a metallic bezel in the form of a rectangular frame is attached to the resin frame. Thus, the display panel and the light source unit are held between the frame and the bezel. Furthermore, the liquid crystal display device comprises a drive circuit board for supplying signals for driving the liquid crystal display panel. This drive circuit board is attached to the resin frame and opposite to a rear surface of the surface light source unit.

Typically, one end of the drive circuit board is located adjacent to side edges of the resin frame and bezel and is fixed thereto by using screws to tighten it with the resin frame and bezel. The other end of the drive circuit board is opposed to an intermediate portion of the resin frame and is fixed thereto by using screws to tighten it with the resin frame if the resin frame has a margin in thickness. On the contrary, if the resin frame has no margin in thickness, the other end of the drive circuit board is fixed to the resin frame using a double-sided adhesive tape.

In particular, modern liquid crystal display devices are expected to be thinner and lighter in weight due to market trends or in behalf of enclosures, and the resin frame, the metallic bezel, and the drive circuit board all have a tendency toward thinness. If both ends of the drive circuit board are fixed using screws, the substrate will be strong enough to withstand external impacts, but the liquid crystal display device entirely becomes thicker, thereby hindering attempts to reduce the thickness and weight.

Alternatively, if one end of the drive circuit board is fixed to the resin frame using the double-sided adhesive tape, the drive circuit board will be readily affected by external impacts or vibration and may slip out easily from the resin frame. If the drive circuit board slips out, a flexible printed circuit board electrically connecting the liquid crystal display panel and the drive circuit board together will be open-circuited to cause inappropriate displays or an optical sheet of the surface light source unit will be deflected to cause inappropriate displays. Furthermore, with the double-sided adhesive tape, the surface light source unit may contribute to making luminance irregular and lower the efficiency of assembly operation and repairability.

BRIEF SUMMARY OF THE INVENTION

The present invention has been contrived in consideration of these circumstances, and its object is to provide a flat display device capable of being reduced in weight and thickness, enabling a drive circuit board to be reliably fixed so as not to be affected by external impacts or the like, and enjoying improved efficiency of assembly operation and repairability.

In order to achieve the above object, a flat display device according to the present invention comprises a substantially rectangular flat display panel having an effective display region, a substantially rectangular surface light source unit opposed to the flat display panel, a substantially rectangular frame carrying the flat display panel and the surface light source unit thereon, a bezel in the form of a substantially rectangular frame having an opening corresponding to the effective display region of the flat display panel and attached to the frame so that the display panel and the surface light source unit are held between the frame and the bezel, and a drive circuit board electrically connected to the flat display panel and opposed to the surface light source unit to supply signals for driving the flat display panel, wherein the frame has a projecting portion and the drive circuit board has an engaging portion held in engagement with the projecting portion.

In addition, according to the flat display device of the present invention, the projecting portion of the frame extends substantially parallel with the surface light source unit, and the engaging portion of the drive circuit board has an engaging projection inserted between the projecting portion of the frame and the surface light source unit.

Furthermore, according to the flat display device of the present invention, the projecting portion of the frame extends in a direction perpendicular to the surface light source unit, and the engaging portion of the drive circuit board has an engaging groove into which the projecting portion of the frame is fitted.

According to the liquid crystal display device constructed in this manner, the drive circuit board and the frame are connected and fixed together using the projecting portion provided on the frame, thereby allowing the drive circuit board to be easily fixed and repaired to improve operational efficiency. Additionally, this configuration provides an improved fixing strength sufficient to withstand external impacts, compared to the use of the double-side adhesive tape. This flat display device does not adversely affect the surface light source unit, enables the number of required screws to be reduced, and allows its weight and thickness to be diminished.

Consequently, by reducing the number of locations where the drive circuit board is screwed, a flat display device can be provided which is lighter in weight and thinner, which enables the drive circuit board to be reliably fixed so as to withstand external impacts or the like, and which enjoys improved efficiency of assembly operation and repairability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 5 show a liquid crystal display device according to an embodiment of the present invention, in which:

FIG. 1 is a perspective view showing the liquid crystal display device;

FIG. 2 is an exploded perspective view of the liquid crystal display device;

FIG. 3 is a plane view showing a rear side of the liquid crystal display device;

FIG. 4 is an enlarged exploded perspective view showing a projection of a frame of the liquid crystal display device and an engaging projection of a drive circuit board; and FIG. 5 is a sectional view taken along line V—V in FIG. 3;

DETAILED DESCRIPTION OF THE INVENTION

A liquid crystal display device according to the present invention will be described in detail with reference to the accompanying drawings.

Figure 1:
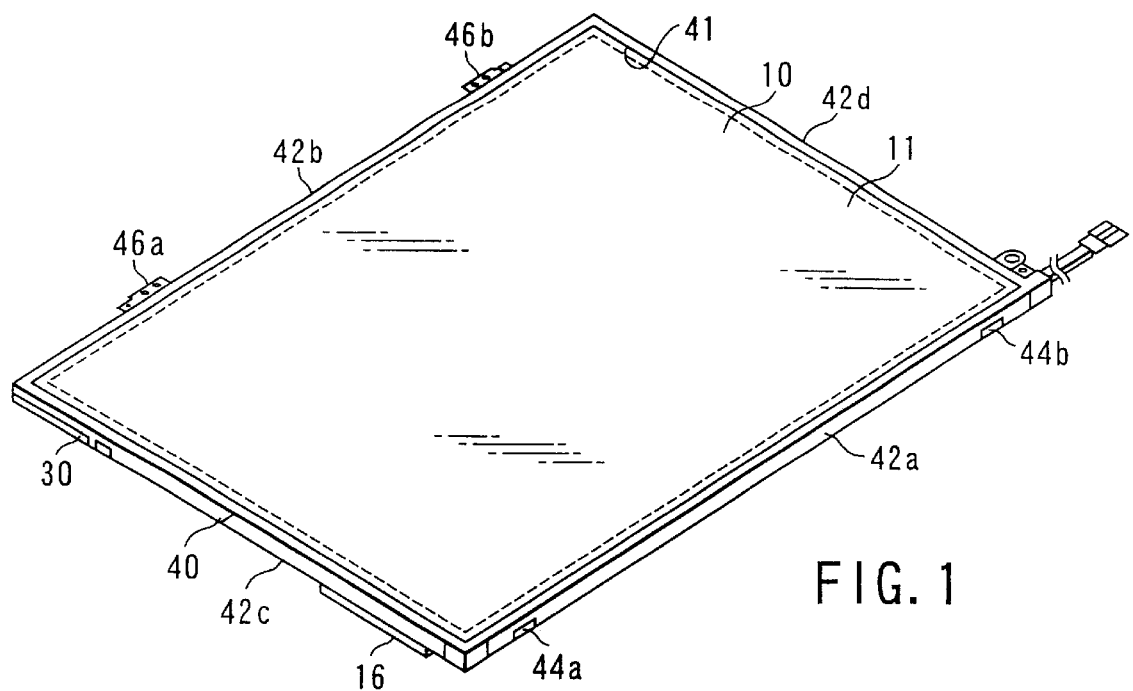
Figure 3:
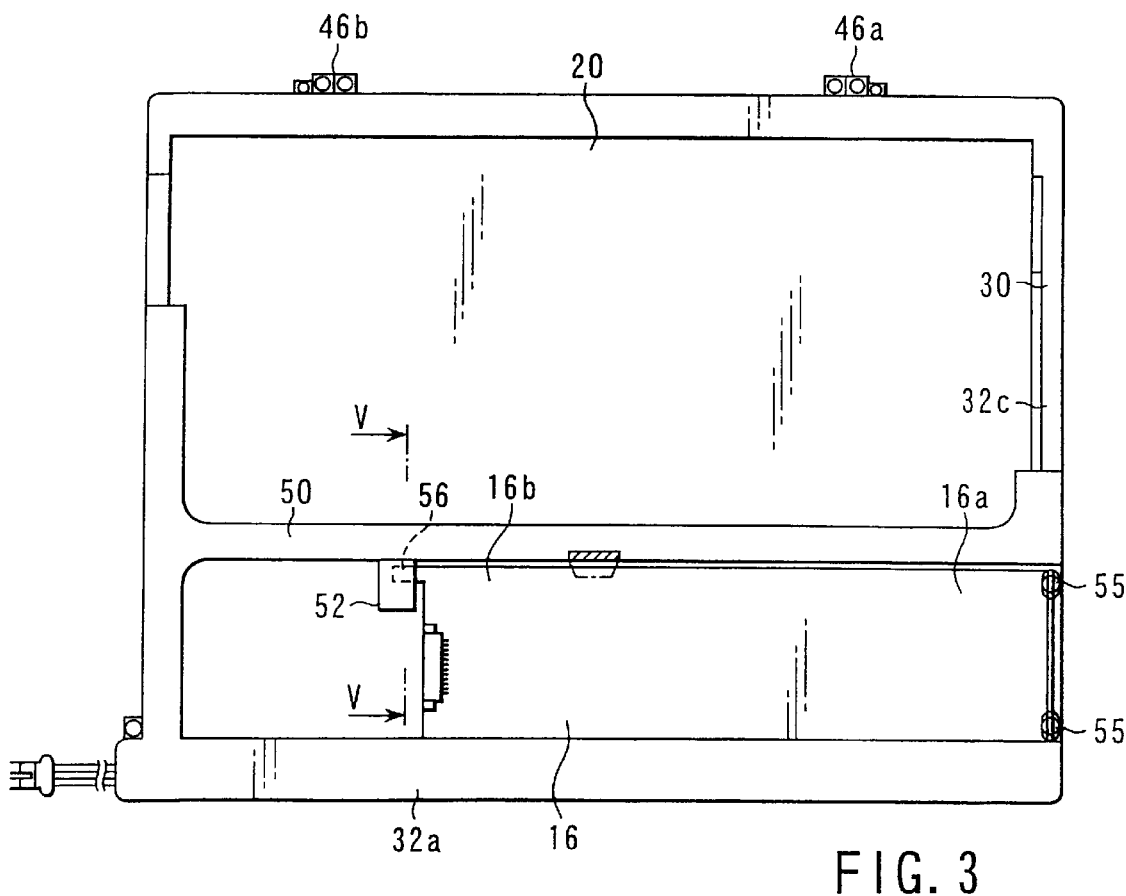
Figure 2:
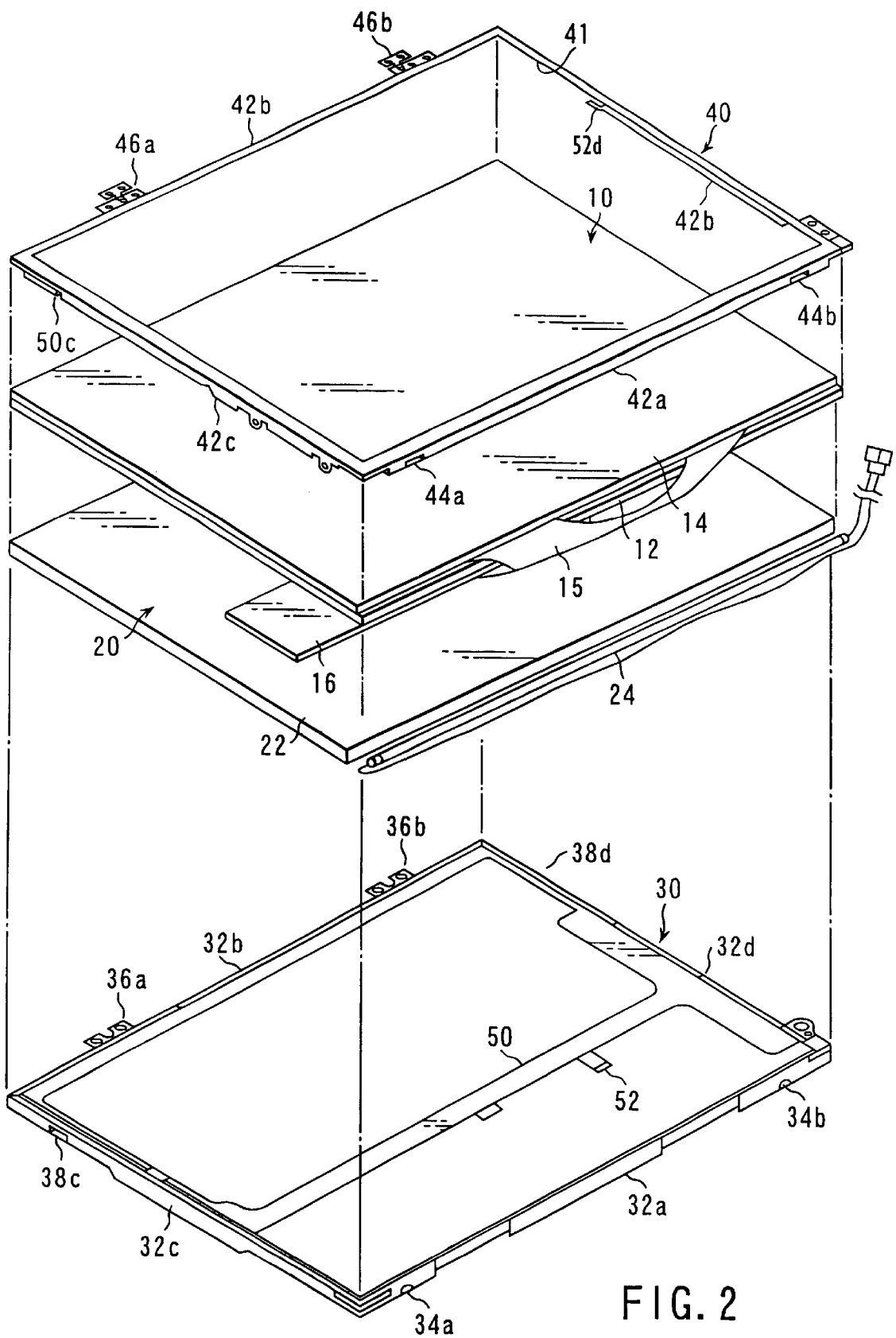
Figure 4:
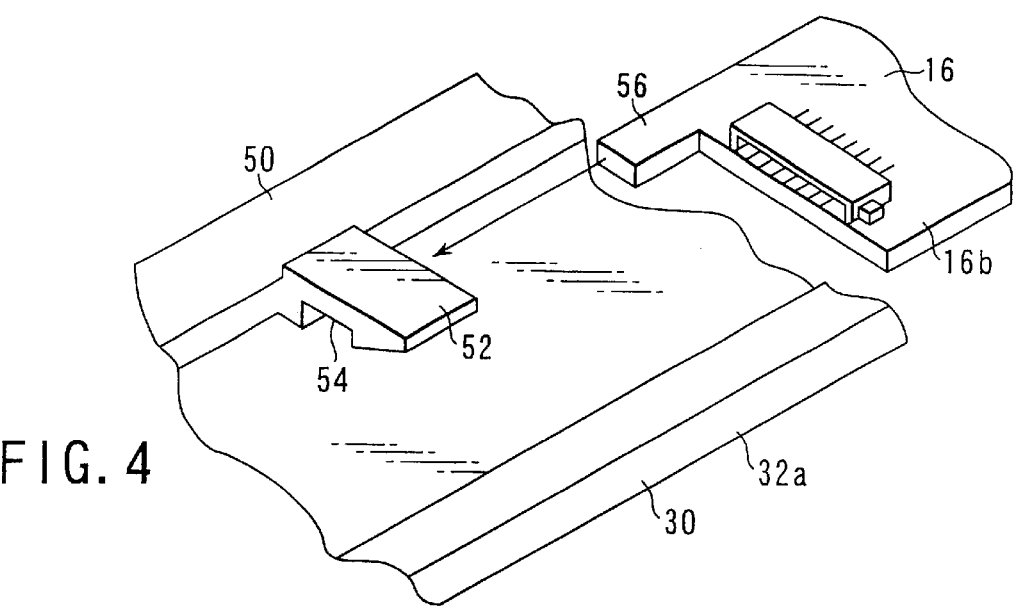
Figure 5:
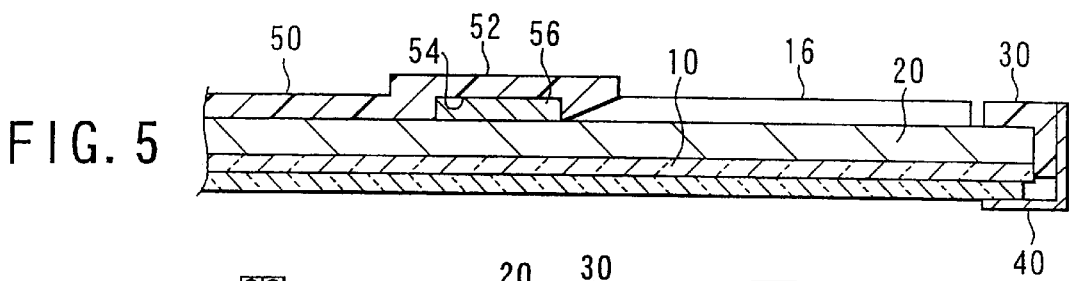

As shown in FIGS. 1 and 2, the liquid crystal display device comprises a rectangular liquid crystal display panel 10, having an effective display region with a diagonal dimension of 11.3 inches, and a substantially rectangular surface light source unit 20 put on the back surface of the panel 10. The liquid crystal display device 10 and the surface light source unit 20 are placed on a substantially rectangular resin frame 30.

The liquid crystal display panel 10 is provided with a rectangular array substrate 12, an opposite substrate 14, a liquid crystal layer (not shown) sealed up between the substrates, etc. A large number of display pixels, switching elements, wires, and driver circuits including analog sample hold circuits are formed on the array substrate 12. The substrate 12 has an effective display region 11 indicated by broken line in FIG. 1. Further, a drive circuit board 16 including a digital analog conversion circuit (DAC) is connected to the array substrate 12 through a flexible printed circuit (FPC) 15. The circuit board 16 is located on the back surface of the surface light source unit 20.

The surface light source unit 20, which is of the side-edge type, comprises a rectangular light guide plate 22 of acrylic resin, a tubular light source 24 opposed to one side edge of the plate 22, optical sheets such as diffusion sheets or focusing sheets (not shown), etc.

The surface light source unit 20 and the liquid crystal display panel 10 are placed on the rectangular frame 30 of synthetic resin. A metallic bezel 40 in the form of a rectangular frame is put on the peripheral edge portion of the panel 10 and joined to the frame 30. Thus, the display panel 10 and the light source unit 20 are held between the frame 30 and the bezel 40. The bezel 40 is formed of a stainless-steel sheet of 0.2-mm thickness.

The metallic bezel 40 is joined to the frame 30 in a manner such that its one long side portion is fitted in its corresponding long side portion of the resin frame 30 and the other long side portion in engagement with its corresponding long side portion of the frame 30. Further, the bezel 40 has a rectangular opening 41 that corresponds to the effective display region 11 of the liquid crystal display panel 10.

More specifically, fitting lugs 34a and 34b are formed integrally on the one side wall 32a of the frame 30, protruding individually outward from the longitudinally opposite end portions thereof. Correspondingly, substantially rectangular fitting holes 44a and 44b are formed individually in the longitudinally opposite end portions of the one long side wall 42a of the metallic bezel 40. In joining the bezel 40 to the frame 30, the lugs 34a and 34b of the frame 30 are fitted into the fitting holes 44a and 44b of the bezel 40, respectively.

Moreover, plate-like fitting projections 36a and 36b are formed integrally on the other long side wall 32b of the frame 30, protruding individually outward from the longitudinally opposite end portions thereof. The projections 36a and 36b are used when the liquid crystal display device is screwed to an external device. A pair of tapped holes 37 are formed in each of the projections 36a and 36b.

Corresponding to the projections 36a and 36b of the frame 30, engaging portions 46a and 46b, in the form of a substantially rectangular plate each, are formed on the other long side wall 42b of the bezel 40, protruding individually outward from the longitudinally opposite end portions thereof. In joining the bezel 40 to the frame 30, the engaging portions 46a and 46b are put on their corresponding projections 36a and 36b and then turned up in a manner such that the projections 36a and 36b of the frame 30 are pinched by the engaging portions 46a and 46b, respectively, to engage the engaging portions 46a and 46b with the corresponding projections 36a and 36b.

Moreover, the bezel 40 is partially notched so that fitting claws 50c and 50d are formed on the short side walls 42c and 42d of the bezel 40, respectively. Corresponding to the fitting claws 50c and 50d of the bezel, furthermore, recesses 38c and 38d are formed in the short side walls 32c and 32d of the frame 30, respectively. In joining the bezel 40 to the frame 30, the fitting claws 50c and 50d of the bezel 40 are bent inward and fitted into the recesses 38c and 38d of the frame, respectively.

As shown in FIGS. 2 to 5, the frame 30 is formed into a rectangle and integrally comprises a connection frame 50 extending between the pair of short sides and parallel with the long sides. The connection frame 50 has a projecting portion 52 projecting toward the long side 32a. The projecting portion 52 extends substantially parallel with the surface light source unit 20 and has an engagement recess 54 formed in the surface thereof opposing to the surface light source unit, the engagement recess 54 extending parallel with the connection frame 50.

On the other hand, the drive circuit board 16 is formed into an elongate rectangle and is shorter than the surface light source unit 20. The drive circuit board 16 is located on a rear surface of the surface light source unit 20 and attached to the frame 30.

More specifically, the drive circuit board 16 is located between the long side 32a of the frame 30 and the connection frame 50 and attached to the frame opposite to the surface light source unit 20. The drive circuit board 16 has a first end 16a located adjacent to the short side 32c of the frame 30 and a second end 16b located at an intermediate portion of the frame. The first end 16a is screwed to the short side 32c of the frame 30 and to the short side 42c of the bezel 40 using two screws 55, and is also connected to the ground via the bezel 40.

The drive circuit board 16 also comprises an engaging projection 56 projecting parallel with the surface light source unit 20 from the second end 16b. The engaging projection 56 engages the recess 54 of the projecting portion 52 in a fashion being held between the projecting portion 52 and the surface light source unit 20.

According to the liquid crystal display device constructed in this manner, the second end 16b of the drive circuit board 16 located at the intermediate portion of the frame 30 is held in engagement with the projecting portion 52 of the frame without using screws. Consequently, the number of locations to be screwed decreases to facilitate fixation of the drive circuit board 16, thereby enabling the liquid crystal display device to be assembled more easily and making the liquid crystal display device much lighter in weight and thinner. Additionally, compared to the use of the double-sided adhesive tape, the repairability of the liquid crystal display device can be improved and the drive circuit board 16 can maintain a mounting strength sufficient to withstand external impacts or the like.

Figure 6:
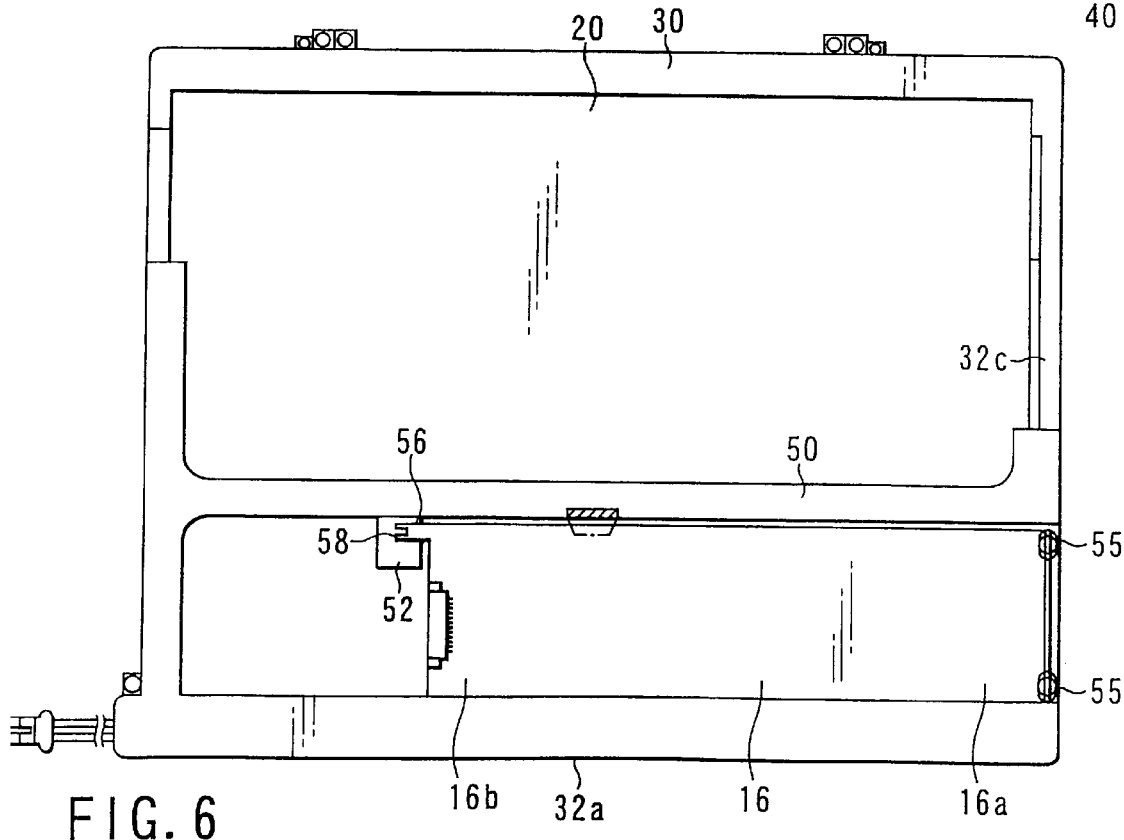
FIG. 6 is a plane view showing a rear side of a liquid crystal display device according to another embodiment of the present invention.
Figure 7:
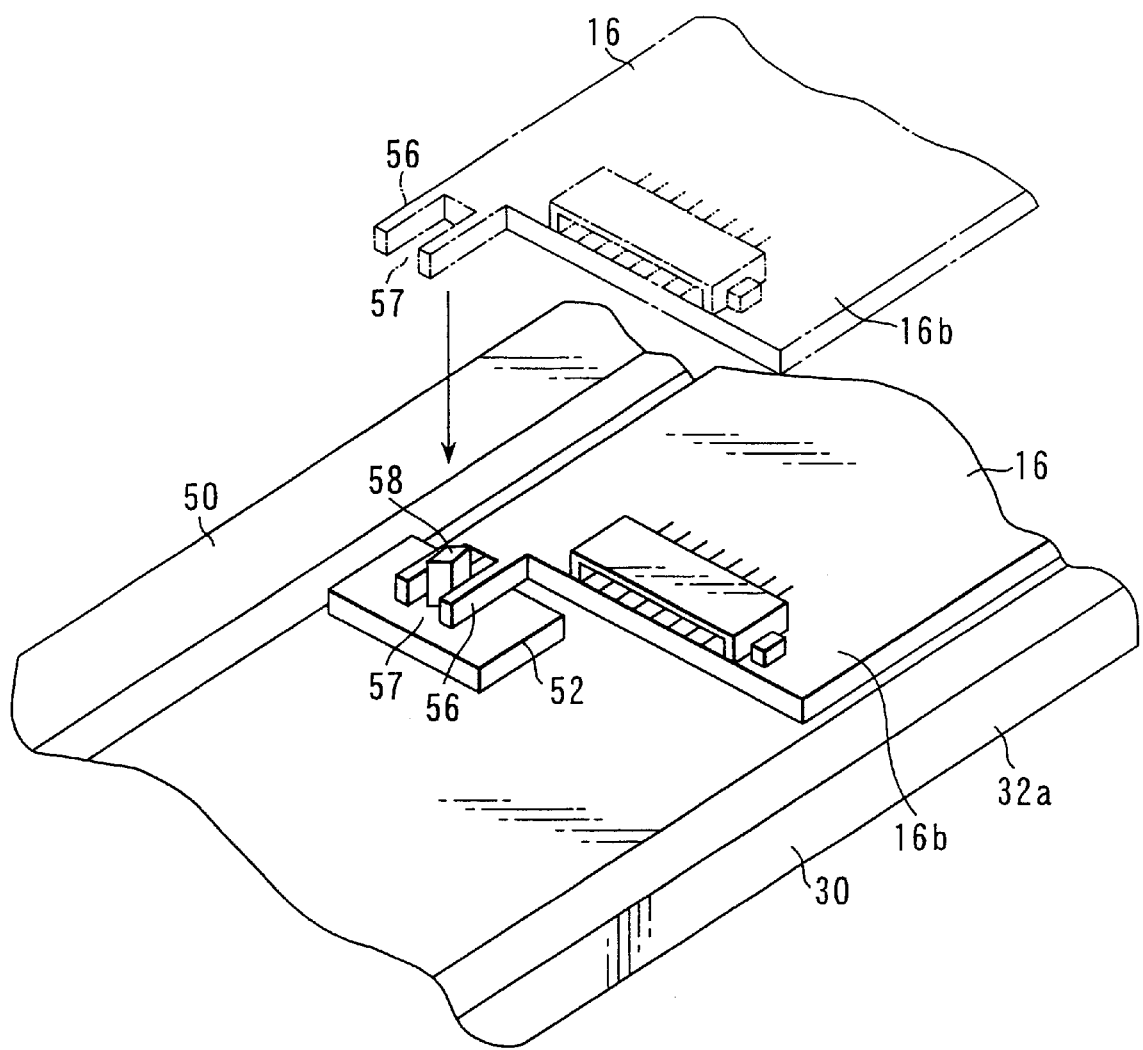
FIG. 7 is an enlarged exploded perspective view showing a projection of a frame of the liquid crystal display device according to the another embodiment and an engaging projection of a drive circuit board.

Next, a liquid crystal display device according to another embodiment of the present invention will be explained. As shown in FIGS. 6 and 7, according to this embodiment, the frame 30 has a projecting portion 52 provided at an intermediate portion of the connection frame 50 and projecting parallel with the surface light source unit 20 toward the long side 32a of the frame. In addition, the projecting portion 52 has an engaging projection 58 protruding in a direction perpendicular to the rear surface of the surface light source unit 20.

The drive circuit board 16 has the first end 16a located adjacent to the short side 32c of the frame 30 and the second end 16b located at the intermediate portion of the frame. The first end 16a is screwed to the short sides of the frame 30 and of the bezel 40 using two screws 55, and is also connected to the ground via the bezel 40.

The drive circuit board 16 also comprises an engaging projection 56 projecting from the second end 16b and having an engagement groove 57 formed therein. The engaging projection 56 is connected to the projecting portion 52 by fitting the engaging projection 58 on the projecting portion 52 of the connection frame 50, in the engagement groove 57.

The engaging projection 58 has a projection height smaller than or equal to those of electronic parts mounted on the drive circuit board 16. In addition, the other part of the configuration is the same as those in the above-mentioned embodiment. Like parts are denoted by the same reference numerals and detailed description thereof will be omitted.

According to the embodiment constructed in this manner, the drive circuit board 16 has the first end 16a screwed to the frame 30 and the bezel 40, and the second end 16b attached to the frame 30 in engagement with the engaging projection 58 provided on the projecting portion 52 of the frame 30. Consequently, the number of locations of the drive circuit board 16 which must be screwed decreases to facilitate fixation of the drive circuit board 16, thereby enabling the liquid crystal display device to be assembled more easily and making the liquid crystal display device much lighter in weight and thinner. Additionally, compared to the use of the double-sided adhesive tape, the repairability of the liquid crystal display device can be improved and the drive circuit board 16 can maintain a mounting strength sufficient to withstand external impacts or the like.

Additional advantages and modifications will readily occur to those skilled in the art. Therefore, the invention in its broader aspects is not limited to the specific details and representative embodiments shown and described therein. Accordingly, various modifications may be made without departing from the spirit or scope of the general inventive concept as defined by the appended claims and their equivalents. For example, the positions where the projecting portion, the engaging projection, the engagement groove, and the like are disposed as well as their shapes are not limited to the above described embodiments but may be varied as required.

What is claimed is:

1. A flat display device comprising:
   a substantially rectangular flat display panel having an effective display region;
   a substantially rectangular surface light source unit opposed to the flat display panel;
   a substantially rectangular frame carrying the flat display panel and the surface light source unit thereon, the frame having a projecting portion;
   a bezel in the form of a substantially rectangular frame having an opening corresponding to the effective display region of the flat display panel and attached to the frame so that the display panel and the surface light source unit are held between the frame and the bezel; and
   a drive circuit board electrically connected to the flat display panel and opposed to the surface light source unit to supply signals for driving the flat display panel, the drive circuit board including a first end located adjacent to a side wall of the frame, and a second end located at an intermediate portion of the frame and having an engaging portion which is held in engagement with the projecting portion.

2. A flat display device according to claim 1, wherein the projecting portion of the frame extends substantially parallel with the surface light source unit, and the engaging portion of the drive circuit board has an engaging projection inserted between the projecting portion of the frame and the surface light source unit.

3. A flat display device according to claim 2, wherein the engaging projection of the drive circuit board extends substantially parallel with the surface light source unit.

4. A flat display device according to claim 1, wherein the projecting portion of the frame includes an engaging projection extending in a direction perpendicular to the surface light source unit, and
   the engaging portion of the drive circuit board has an engagement groove into which the projecting portion of the frame is fitted.

5. A flat display device according to claim 1, wherein the first end of the drive circuit board is screwed to the frame and the bezel.

6. A flat display device according to claim 1, wherein the first end of the drive circuit board is screwed to the frame and the bezel and is ground-connected to the bezel.

7. A flat display device according to claim 1, wherein the frame is formed in a shape of a rectangular frame and integrally comprises a connection frame extending between two opposed sides, and the projecting portion extends from the connection frame.

8. A flat display device comprising:
   a substantially rectangular flat display panel having an effective display region;
   a substantially rectangular surface light source unit opposed to the flat display panel;
   a substantially rectangular frame carrying the flat display panel and the surface light source unit thereon, the frame integrally including a connection frame extending between two opposed sides, and a projecting portion extending from the connection frame;

a bezel in the form of a substantially rectangular frame having an opening corresponding to the effective display region of the flat display panel and attached to the frame so that the display panel and the surface light source unit are held between the frame and the bezel; and a drive circuit board electrically connected to the flat display panel and opposed to the surface light source unit to supply signals for driving the flat display panel, the drive circuit board having an engaging portion held in engagement with the projecting portion.

9. A flat display device according to claim 8, wherein the drive circuit board has a first end located adjacent to a side wall of the frame, and a second end located at an intermediate portion of the frame and having the engaging portion.

10. A flat display device according to claim 8, wherein the projecting portion of the frame extends substantially parallel with the surface light source unit, and the engaging portion of the drive circuit board has an engaging projection inserted between the projecting portion of the frame and the surface light source unit.

11. A flat display device according to claim 10, wherein the engaging projection of the drive circuit board extends substantially parallel with the surface light source unit.

12. A flat display device according to claim 8, wherein the projecting portion of the frame includes an engaging projection extending in a direction perpendicular to the surface light source unit, and the engaging portion of the drive circuit board has an engagement groove into which the projecting portion of the frame is fitted.

13. A flat display device according to claim 8, wherein the first end of the drive circuit board is screwed to the frame and the bezel.

14. A flat display device according to claim 8, wherein the first end of the drive circuit board is screwed to the frame and the bezel and is ground-connected to the bezel.

* * * * *